United States Patent [19]
Schulze et al.

[11] Patent Number: 5,755,259
[45] Date of Patent: May 26, 1998

[54] SAFETY SHUT-OFF FOR GAS LINES

[75] Inventors: Klaus Schulze, Gernrode; Günter Albrecht, Weddersleben, both of Germany

[73] Assignee: Mertik Maxitrol GmbH & Co., KG, Germany

[21] Appl. No.: 687,153

[22] Filed: Jul. 24, 1996

Related U.S. Application Data

[62] Division of Ser. No. 303,672, Sep. 9, 1994, abandoned, which is a continuation of PCT/EP93/03686, Dec. 24, 1993.

[30] Foreign Application Priority Data

| Jan. 9, 1993 | [DE] | Germany | 43 00 432.6 |
| Dec. 24, 1993 | [DE] | Germany | 43 44 575.6 |
| Dec. 24, 1993 | [DE] | Germany | 9319910 U |

[51] Int. Cl.$^6$ .................................................. F16K 17/168
[52] U.S. Cl. .................... 137/460; 137/517; 137/543.17; 137/614.19
[58] Field of Search .................. 137/517, 460, 137/543.17, 614.19

[56] References Cited

U.S. PATENT DOCUMENTS

| 501,437 | 7/1893 | Pierce | 137/517 |
| 1,510,418 | 9/1924 | Seeley | 137/614.19 X |
| 2,223,944 | 12/1940 | Roy | 137/517 |
| 2,996,077 | 8/1961 | Taggert | 137/537 |
| 3,406,715 | 10/1968 | Hruby, Jr. | 137/517 X |
| 3,661,175 | 5/1972 | Tillman | 137/517 |
| 3,709,255 | 1/1973 | Ciotti | 137/614.19 |
| 3,719,401 | 3/1973 | Peruglia | 137/517 |
| 3,735,777 | 5/1973 | Katzer et al. | 137/517 X |
| 3,794,077 | 2/1974 | Fanshier | 137/517 X |
| 4,009,729 | 3/1977 | Vik | 137/614.19 X |
| 4,105,044 | 8/1978 | Davitt | 137/517 |
| 4,178,958 | 12/1979 | Palau | 137/460 |
| 4,223,692 | 9/1980 | Perry | 137/460 X |
| 4,269,223 | 5/1981 | Carter et al. | 137/517 X |
| 4,295,412 | 10/1981 | Hachiro | 137/454.2 X |
| 4,564,483 | 1/1986 | Jeans | 137/517 X |
| 4,727,903 | 3/1988 | Sturgis et al. | 137/461 |
| 4,830,046 | 5/1989 | Holt | 137/517 X |
| 4,955,407 | 9/1990 | Inoue | 137/454.2 |
| 5,293,898 | 3/1994 | Masloff | 137/517 |

FOREIGN PATENT DOCUMENTS

| 0268520 | 5/1988 | European Pat. Off. . | |
| 74260 | 11/1960 | France . | |
| 1409416 | 7/1965 | France . | |
| 2299186 | 8/1976 | France . | |
| 1600685 | 1/1970 | Germany . | |
| 2924533 | 1/1981 | Germany | 137/460 |
| 8705359 | 8/1987 | Germany . | |
| 8815392 | 3/1989 | Germany . | |

(List continued on next page.)

*Primary Examiner*—John Rivell
*Attorney, Agent, or Firm*—Harness, Dickey & Pierce, P.L.C.

[57] ABSTRACT

The invention takes as its basis the problem of creating a safety sealing device for gas pipes by which the bearing of the valve body should be frictionless, require no maintenance and which causes only minimal flow resistance. Further the safety sealing device should not require outward sealing connections. It should be easy to install and able to be fitted into existing gas piping or fittings without having to change them.

The problem is solved in that with safety sealing devices with a valve body (6) which can be pressed against a valve seat (1), whereby the valve body (6) is supported so that it is movable in the axial direction of the valve seat (1) is against the force of a locking spring (8), the valve body is conducted only through a spring and is otherwise freely movable without additional support points.

The invention concerns a safety sealing device for closing gas conduits in cases of damage, e.g. pipe bursts or hose ruptures, in order to prevent an uncontrolled leakage of gas and thereby a dangerous situation.

12 Claims, 8 Drawing Sheets

FOREIGN PATENT DOCUMENTS

| | | | |
|---|---|---|---|
| 550424 | 10/1956 | Italy | 137/460 |
| 0139571 | 10/1980 | Japan | 137/460 |
| 0166773 | 9/1984 | Japan | 137/460 |
| 80781 | 10/1955 | Netherlands . | |
| 23012 | 8/1915 | United Kingdom | 137/460 |
| 556863 | 10/1943 | United Kingdom . | |
| 2038989 | 7/1980 | United Kingdom . | |
| 2101702 | 1/1983 | United Kingdom . | |

SAFETY SHUT-OFF FOR GAS LINES

This is a division of U.S. Pat. application Ser. No. 08/303,672, now abandoned filed Sep. 9, 1994 which is a continuation application of PCT/EP93/03686, filed Dec. 24, 1993.

BACKGROUND AND SUMMARY OF THE INVENTION

The invention concerns a safety sealing device for gas conduits with a valve body and a valve seat according to the introductory part of the first patent claim.

These type of safety sealing devices serve, in cases of damage such as pipe bursts or hose ruptures, to seal the gas conduit in order to prevent an uncontrolled leakage of gas and thereby a dangerous situation.

Safety sealing devices for gas conduits have already been known, which are arranged between the supply pipe and a using device and which should ensure that, for example with pipe bursts or hose ruptures, sealing of the supply pipe is achieved.

Thus a safety sealing device is described in WO 92/01184, which seals a piping system should it be damaged without however effecting a premature closure of the supply line should a using device need the amount of gas corresponding to its output over a longer period of time. With this safety sealing device, a valve is supported against the force of a spring such that it can slide in the axial direction of a tubular shaped housing of a slidable plate valve. To achieve this, discs with axial support positions for the plate valve are placed in the housing, the discs having penetrations for gas flow around their circumferences. The housing has threads at both facing ends for connection to the piping or other fittings.

With this solution it is disadvantageous that the movement of the valve head is conducted through supports. Because the available standing pressure forces, which then in cases of damage act on the valve head for the closure movement, is only a few millibars, the spring's force, which determines the flow rate at which the safety sealing device should operate, is extraordinary small. Thus support friction can substantially change this flow rate and hence the results are not reliably reproducible.

This disadvantage is especially serious when it is considered that the valve is not activated under normal operation and therefore no movement of the valve shaft ensues within the bearing, which is exposed to contamination due to the gas flow. The use of such safety sealing devices is, amongst other things, intended however with gas pipes that are laid underground which means that they also have to retain their safety capabilities without maintenance over a longer period of time e.g. several decades.

It is a further disadvantage that with the installation of the valve in a gas pipe two new outward sealing points are made and that when combining the safety device with another fitting, e.g. a hose cock, its constructional length is increased. When extending existing systems, it is necessary to shorten the existing gas supply line correspondingly.

The penetrated discs which serve to bear the plate valve further create an additional pressure loss. Seen as a whole, this thereby results in a rather complex device due to the connection threads and the components.

The invention takes as its basis the problem of creating a safety sealing device for gas pipes by which the bearing of the valve body should be substantially frictionless, require no maintenance and which causes only minimal flow resistance. Further the safety sealing device should not require outward sealing connections. It should be easy to install and able to be fitted into existing gas piping or fittings without having to make modifications thereto.

According to the invention, the problem is solved in that the valve body is conducted only through a spring and is otherwise freely movable without additional support points. Thus the disadvantages associated with such support points and associated frictional forces discussed above are voided.

Advantageous refinements of the invention are taken from the further patent claims given later. Because the safety sealing device has one or more sealing rings at its circumference, which simultaneously serve for attachment and internal sealing, whereby they are pushed into a gas pipe or the inlets or outlets of a gas fitting, whereby the diameter of the sealing rings is larger than the inner diameter of the gas pipe or the inlets or outlets of a gas fitting, it is possible to incorporate the present invention in such supply systems without additional outward sealing connections while at the same time the present invention is capable of easy installation. Preferably thereby, the sealing rings are made in one piece with the tubular shaped valve seat of the ring flanges connected to the safety sealing device.

The outer diameter of the valve body without the elastic sealing element is smaller than inner diameter of the valve seat associated with it, whilst the outer diameter of the valve body with the sealing element is larger than this inner diameter. Also a circular shoulder is formed in the inner diameter of the valve seat at a tubular end-piece in the flow direction thereof. The length of the tubular end piece is so dimensioned that a blocking element, with a sealing element in place, does not leave this tubular shaped end-piece in the closure direction of the safety sealing device, whereas with a missing sealing element, the valve body can be pressed so far into the valve seat that the blocking element protrudes out of the end-piece. Thus, the installation can be carried out very easily, in which the valve body together with the locking spring, the sealing element not being fitted, is placed so far into the valve seat, that the blocking element can readily be connected to a lug belonging to the valve boy in the flow direction. In conclusion, the installation of the sealing element is carried out.

It is an advantage that the lug is provided with a thread on which that for example, a wire clip as blocking element is easily attached and is adjustable in the axial direction of the lug for adjustment purposes.

Of course it also possible that the valve body is screwed on to the lug thread in the flow direction whilst the blocking element, resting on the shoulder of the valve seat, is rigidly attached to the lug thread.

It is shown that it is especially satisfactory if the valve body is suspended plate, which is spring biased so as to rest in the open position on a circlip elastically deformable in the radial direction. The circlip is itself latched into a notch, which is preferably formed in one piece with the valve seat. Thereby the circlip can be formed for example by, an expanding spring or a split annular ring which preferably has three radially inwardly extending flanges distributed evenly around the circumference whereby the flow cross-section is reduced immaterially. Due to the extremely low weight, this model has the advantage that the occurring mass reaction, depending on the installation location which for example has influence on the deflection and balance of forces and therefore also on the closure process, is lower.

That thereby to enable adjustment without changing the flow cross-section, it is a proven advantage if the support shoulder of the spring end facing the valve body is adjustable in the axial direction in that it is connected, for example, to the valve seat by a thread. Due to this adjustable support shoulder, a possibility for adjusting the safety sealing device has been found which suffices without changing the flow cross-section.

In order to achieve a very high sealing efficiency also without additional elastic sealing elements, the valve body and the valve seat should constructed such that either the valve body is spherical in the area of the sealing surface or the opposite valve seat is shaped as a concave sphere in the area of the sealing surface.

For safety sealing devices which are found only in gas pipe lines which are very difficult to access, e.g. in underground gas pipes, it is a proven advantage if the valve body has a leakage bore because it can re-open after repair of the damage which lead to the closure of the safety sealing device.

Especially for use in connection with a commercial gas stopcock, it is an advantage if the safety sealing device is inserted in the gas inlet of the gas stopcock, whereby the plate of the safety sealing device has a lug-shaped extension on its side facing the spring in the axial direction, which protrudes from the same when the safety sealing device is closed whereas it is within the same when the safety sealing device is open. It is of course also possible that the valve seat made in one piece with the gas inlet of the gas stopcock. Thereby the safety sealing device is located so far inside the gas inlet that the lug-shaped extension protrudes into the swivel area of the closure member of the gas stopcock. With this solution the safety sealing device can close completely sealed. A leakage flow bore for automatic re-opening of the gas stopcock is not necessary. With the closing of the gas stopcock, which is normally the case in damage repair, e.g replacing a hose, the lug-shaped extension is pushed in the axial direction whereby the safety sealing device is re-opened so that the gas can flow again after damage repair and on opening the gas stopcock.

For polyethylene gas pipes, connections are made in many cases with so called electro-welded sleeves. For the special use of the safety sealing device in connection with electro-welded sleeves, the safety sealing device is constructed such that the outer diameter of the tubular shaped valve seat is the same as the outer diameter of the gas pipe, whereby a sealing ring, if it is to be used, is dimensioned self-evidently such that its diameter is larger than the outer diameter of the gas pipe. It is obvious that the valve seat can be connected with the electro-welded sleeve in one piece.

Due to the enlargement of the outer diameter of the valve seat or the single piece construction, it is also possible to enlarge the inner diameter of the safety sealing device through which pressure loss caused by the safety sealing device can be minimized.

In order to keep the constructional increase in length small, which is necessary in order to guarantee the double-ended welding length used for connection with the gas pipe, it is an advantage if the safety sealing device has a collar at its outflow end whereby the outer diameter of the collar is smaller than the inner diameter of the gas pipe.

Figure 1:
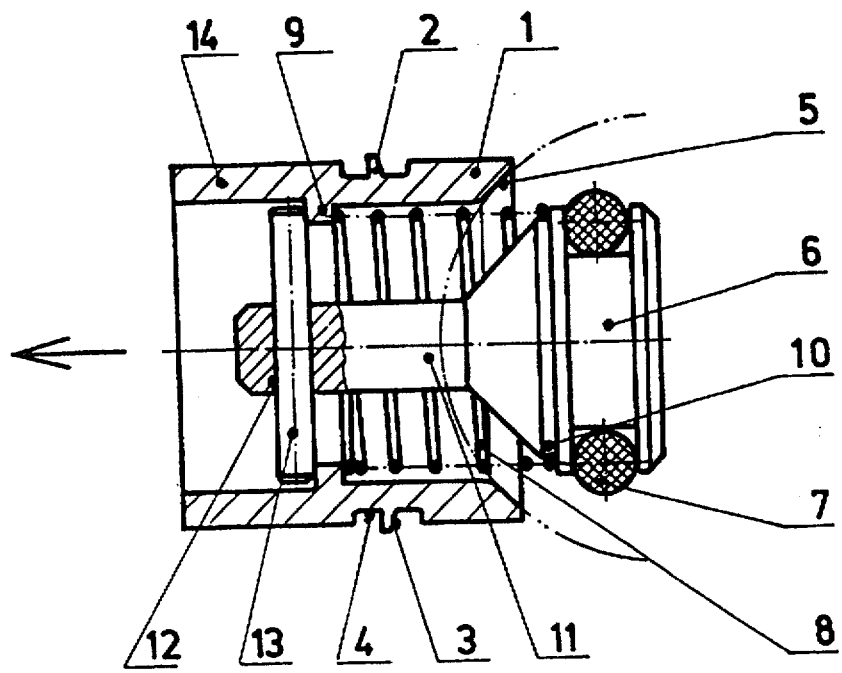
FIG. 1 is a section view showing a safety sealing device for gas pipes according to the invention in the open position.

The safety sealing device for gas pipes, according to the invention, shown in FIG. 1 consists of a tubular shaped valve seat (1), which has at its outer diameter, which is otherwise smaller than the inner diameter gas pipe (26) (not shown in FIG. 1, but shown in different figures) with which the safety sealing device is to be used, a ring flange (2) whose diameter is on the other hand larger than the inner diameter of gas pipe (26). In order to guarantee an easy insertion of the safety sealing device, according to the invention, the ring flange (2) is advantageously provided with an insertion bevel (3). Further it is a proven advantage if the ring flange (2) is provided with a circular groove (4) on both sides in order to achieve a better elasticity by means of the enlarged height of the ring flange (2). Ring flange (2) is intended to form a friction fit sealing relationship with the inside diameter of the gas pipe to which it is fitted and may be slightly deformed during installation.

At its rear face, against the flow direction shown by an arrow, a sealing surface (5) is located in the form of a concave ball. A valve body (6), movable in the axial direction, is arranged within the valve seat (1) and has a ring shaped notch for the accommodation of a circular ring (7) serving as a sealing element. Thereby the valve body (6) and circular ring (7) dimensions are determined such that the outer diameter of valve body (6) without circular ring (7) is smaller than the inner diameter of its associated valve seat (1) whilst the outer diameter of the valve body (6) with mounted circular ring (7) is larger than this inner diameter.

On the flow direction side of valve body (6), one of the valve bodies (6) is held supported in the open position by spring (8) preferably formed as a compression spring, which is supported at its other end by circular shoulder (9) which is integrally formed with and connects to valve body (6) within its associated inner circumference of valve seat (1).

Figure 2:
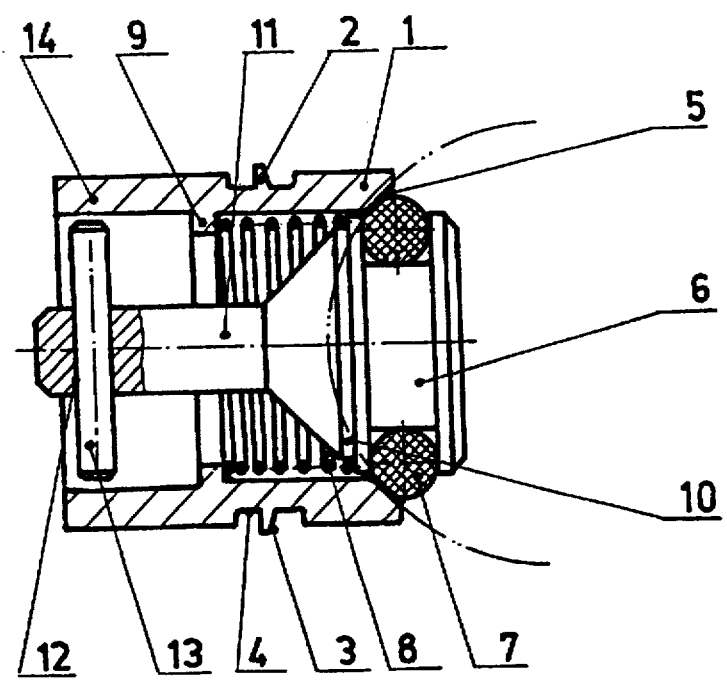
FIG. 2 is a section view showing a safety sealing device for gas pipes according to the invention in the closed position.
Figure 3:
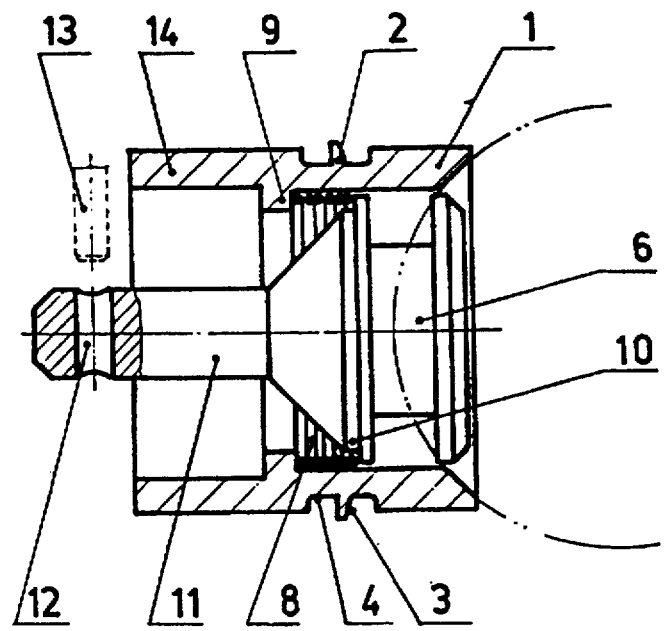
FIG. 3 is a section view showing a safety sealing device for gas pipes according to the invention during assembly and before installation of the elastic sealing element.

For guiding spring (8), the valve body (6) has a circular collar (10) on which a lug (11) is connected in the flow direction. Lug (11) has a through-hole (12) at its end which serves to accommodate a blocking element (13), in this case a rod (FIG. 1). There is the relationship between the length of lug (11) and the length of the tubular shaped end-piece (14) connected on shoulder (9), that the blocking element (13) with mounted circular ring (7) does not leave this tubular shaped end-piece (14) in the closed position of safety sealing device (FIG. 2) whereas without circular ring (7), the valve body (6) can be pressed so far into the valve seat (1) that the blocking element (13) protrudes out of the end piece (14) (FIG. 3).

Figure 4:
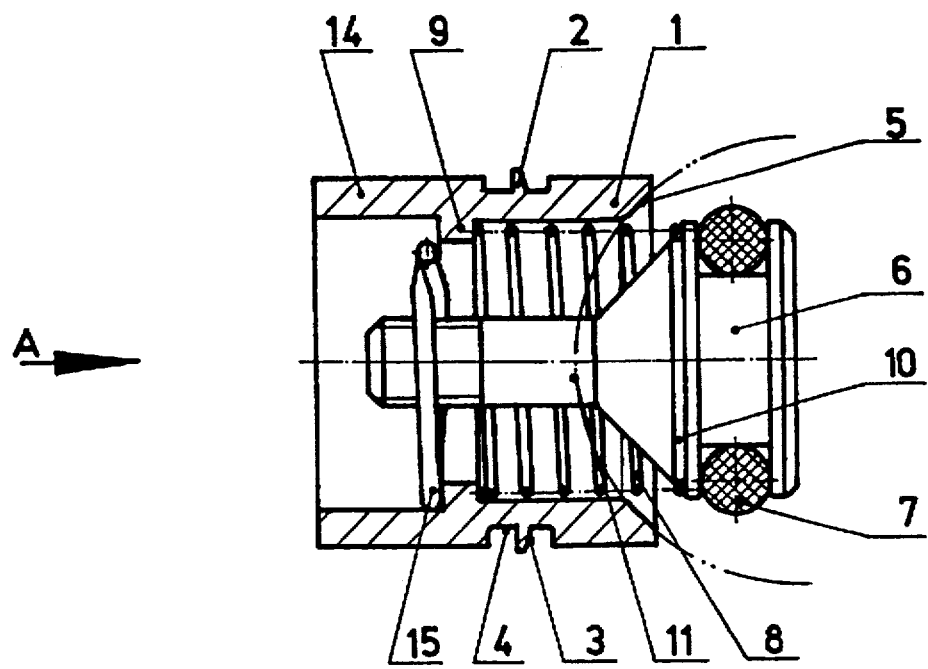
FIG. 4 is a section view of another embodiment of a safety sealing device for gas pipes according to the invention.
Figure 5:
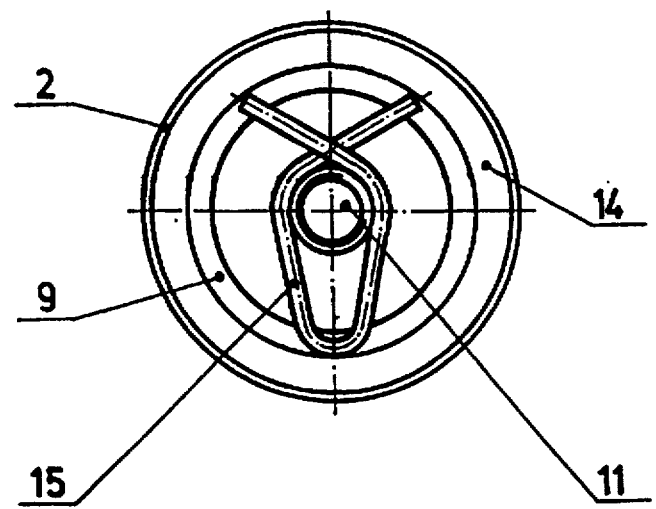
FIG. 5 is a plan view of the safety sealing device according to the invention shown in FIG. 4 as seen looking in the direction of arrow A.

A somewhat different version is shown in FIG. 4. Hereby lug (11) is provided with a thread at its downstream end and a wire clip (15), which is formed such that it can be screwed on to lug (11) (FIG. 5) and serves as blocking element (13).

Figure 6:
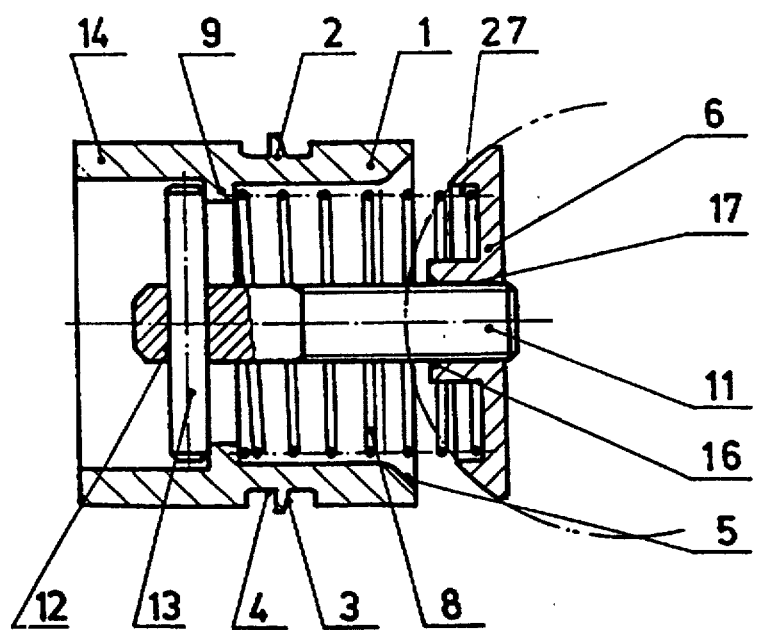
FIG. 6 shows a further version of a safety sealing device for gas pipes according to the invention in the open position.

In FIG. 6 a further version is shown. This solution differs from the previous version in that the valve body (6) and the lug (11) consist of two separate components whereby the valve body (6) has an axial threaded bore (16) with which it is screwed on to the threaded lug (11) located in the flow direction upon which the supported blocking element (13) is rigidly attached to shoulder (9) of valve seat (1). In order to guarantee the necessary sealing and prevent twisting, an appropriate material, e.g. in this case a commercial PTFE (polytetraflorethylene) tape (17) is located between lug (11) and the bore (16). In this version, an elastic sealing element is dispensed with. To achieve the desired sealing efficiency, valve body (6) is spherically shaped whilst the sealing surface (5) is executed as a bevel. To accommodate spring (8) and at the same time to reduce mass, valve body (6) has additionally a recess (27).

Figure 7:
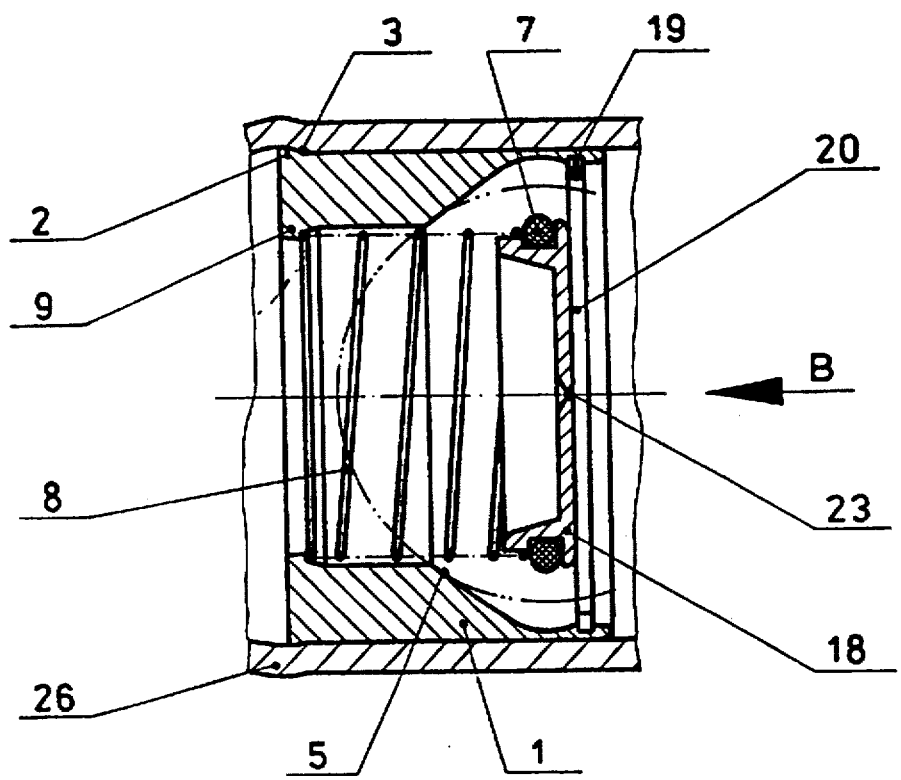
FIG. 7 shows in section a safety sealing device for gas pipes according to the invention in a further version with a freely suspended valve body (6), in the open position.

In a further safety sealing device, according to the invention shown in FIG. 7, the ring flange (2) found at the end of valve seat (1) is made significantly stronger than in the form of construction described above, whereby it also has an insertion bevel (3). This type of valve seat (1) is especially suitable for the installation in gas pipes consisting of polyethylene as they are shown allusively under (26) in FIG. 7. The safety sealing device is hereby installed in which the gas pipe (26), e.g. consisting of polyethylene pipe, is heated. The yielding component is in this case not the ring flange (2) but the gas pipe (26).

Figure 8:
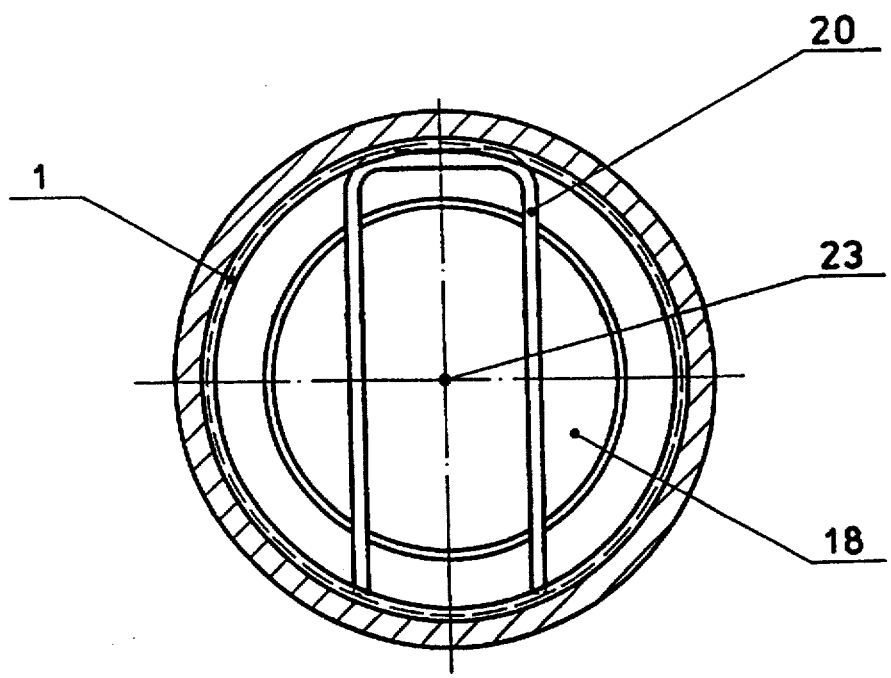
FIG. 8 is a plan view of the safety sealing device according to the invention of FIG. 7 as seen looking in the direction of arrow B.

The valve body consists of a freely suspended plate (18) on spring (8) which in the open position rests against an elastic radially deformable circlip. In this form of construction, the circlip consists of, as can easily be recognized in FIG. 8, an expanding spring (20) which is latched into a circular inner notch (19) of the valve seat (1).

Figure 9:
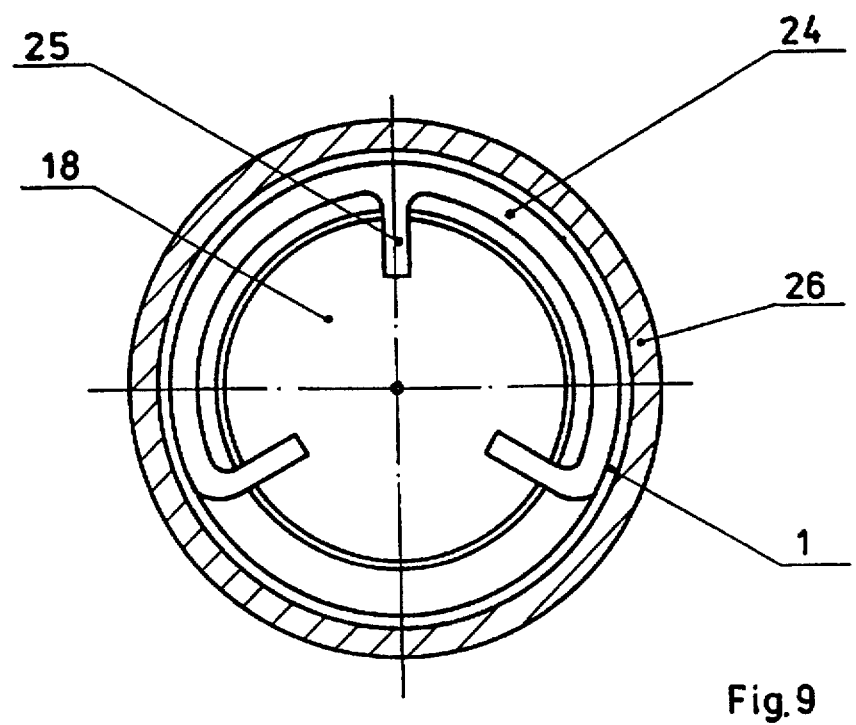
FIG. 9 is a plan view of the safety sealing device according to the invention from FIG. 7 with a different circlip for the spring.

Instead of the expanding spring (20), other shaped circlips can also be used. For example in FIG. 9, the circlip is formed by a split circular ring (24) which has preferably three radially inwardly extending flanges (25) arranged regularly around the circumference. Thereby it is to be observed that the surface area of the circlip which may reduce the flow cross-section is to be kept as low as possible.

A circular ring (7) located on plate (18) serves to achieve the desired sealing efficiency, whilst the sealing surface (5) of valve seat (1) is on the other hand constructed in the form of a concave ball.

Because gas piping of polyethylene tubing is generally underground and that the safety sealing device can only be reached with difficulty, the plate (18) has a leakage bore (23), which leads to a definitive and self-evident permissible leakage flow, whereby after repair of damage which caused the safety sealing device to close, the device re-opens itself.

Figure 10:
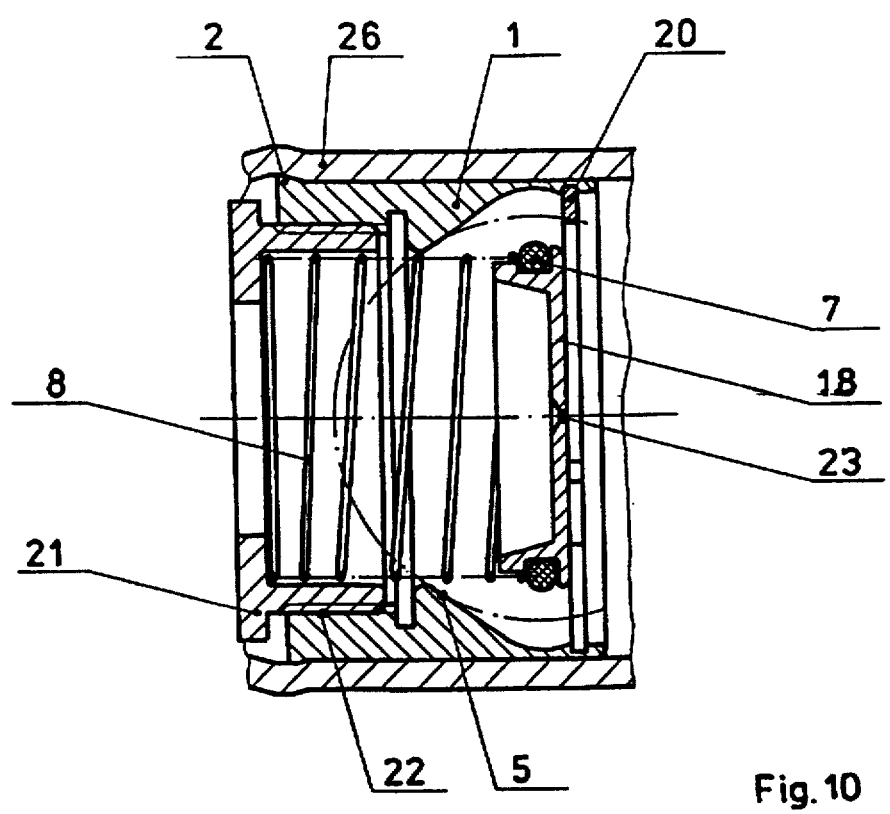
FIG. 10 shows in section an adjustable safety sealing device for gas pipes according to the invention in a further version, in the open position.

In FIG. 10, the safety sealing device already described in FIG. 7 is changed to the effect that the circlip shoulder (21), constructed as a separate component, is connected to valve seat (1) via a thread (22) and is thereby adjustable in the axial direction. This axial adjustment enables the spring force biasing the valve 18 into an open position to be varied thereby enabling control of the flow rate at which the valve is moved into a closed position. Thus an adjustment is made possible which dispenses with the need to change the flow cross-section.

Figure 11:
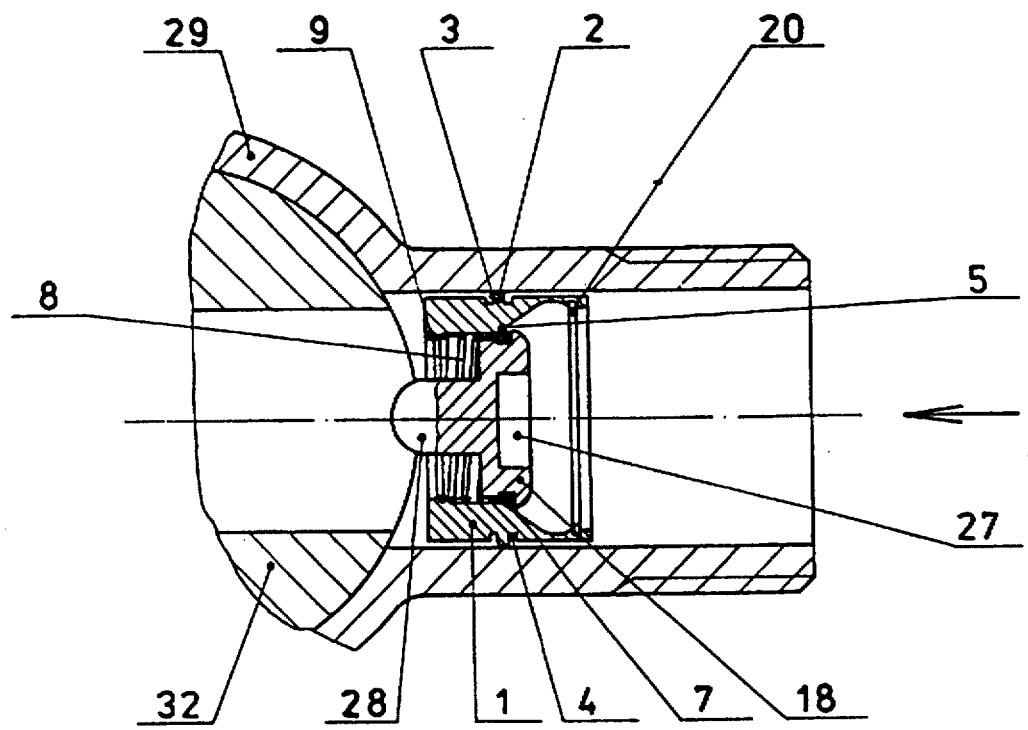
FIG. 11 shows a safety sealing device for gas pipes according to the invention in the gas inlet of a gas stopcock, in the closed position.
Figure 12:
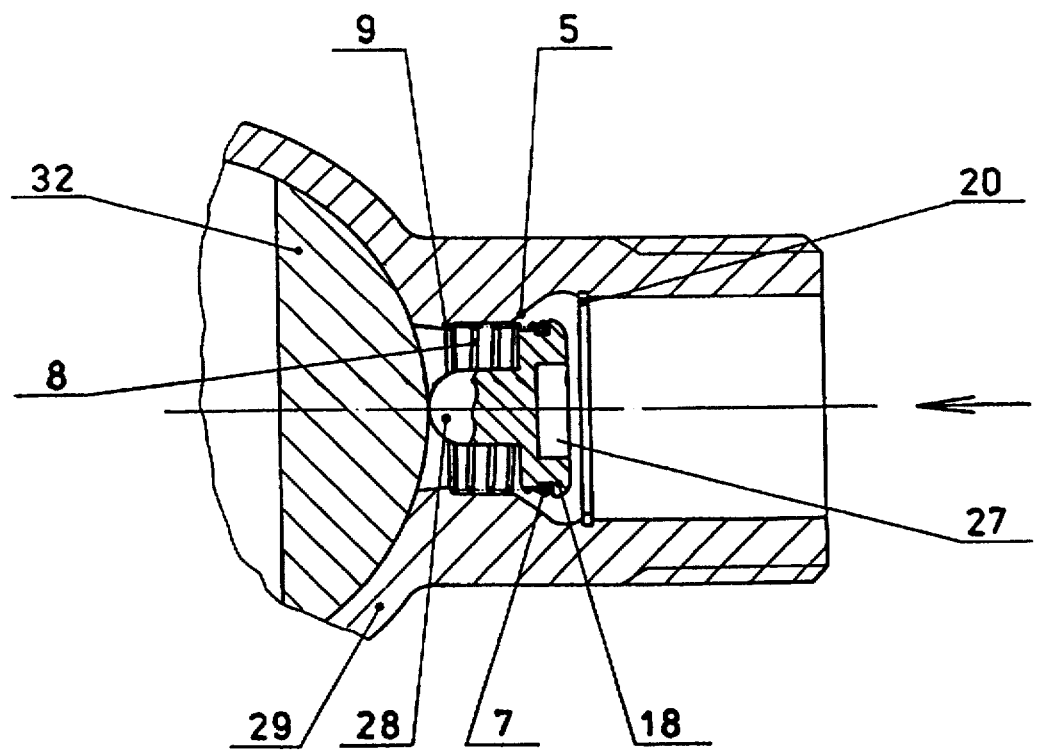
FIG. 12 shows a safety sealing device for gas pipes according to the invention in the gas inlet of a gas stopcock, in the open position.

The use of the safety sealing device, according to the invention, in connection with a commercial gas stopcock (29) is shown in FIGS. 11 and 12. Whilst in FIG. 11, the safety sealing device is inserted in the gas inlet of the gas stop cock, in FIG. 12 the valve seat (1) is constructed in one-piece with the gas inlet of the gas stopcock (29). In both constructions, plate (8) of the safety sealing device has a lug-shaped extension (28) on its side facing spring (8) in the axial direction, which protrudes from the safety sealing device when it is closed (FIG. 11), whereas in the open position of the safety sealing device the lug (28) is within it. Thereby the safety sealing device is arranged so far in the gas inlet that the lug-formed extension (28) protrudes into swivel range of the closure member (32) of the gas stopcock (29) when the safety sealing device is closed. With the closing of the gas stopcock (29), which usually takes place when damage occurs, the lug-shaped extension (28), whose end is correspondingly shaped, is pushed in the axial direction (FIG. 12), whereby the safety sealing device completely re-opens again due to the effects of spring (8), so that after damage repair gas flow can take place again when the gas stopcock (29) is opened.

Figure 13:
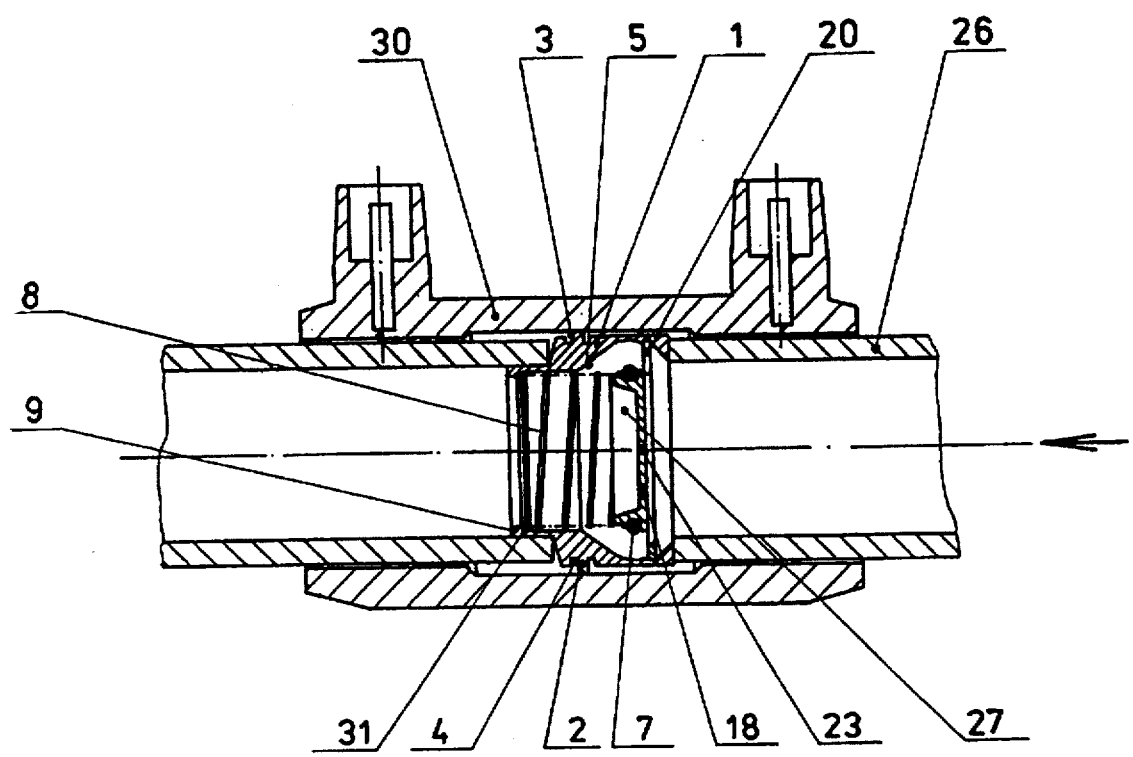
FIG. 13 shows a safety sealing device for gas pipes according to the invention used in an electro-welded sleeve, in the open position.
Figure 14:
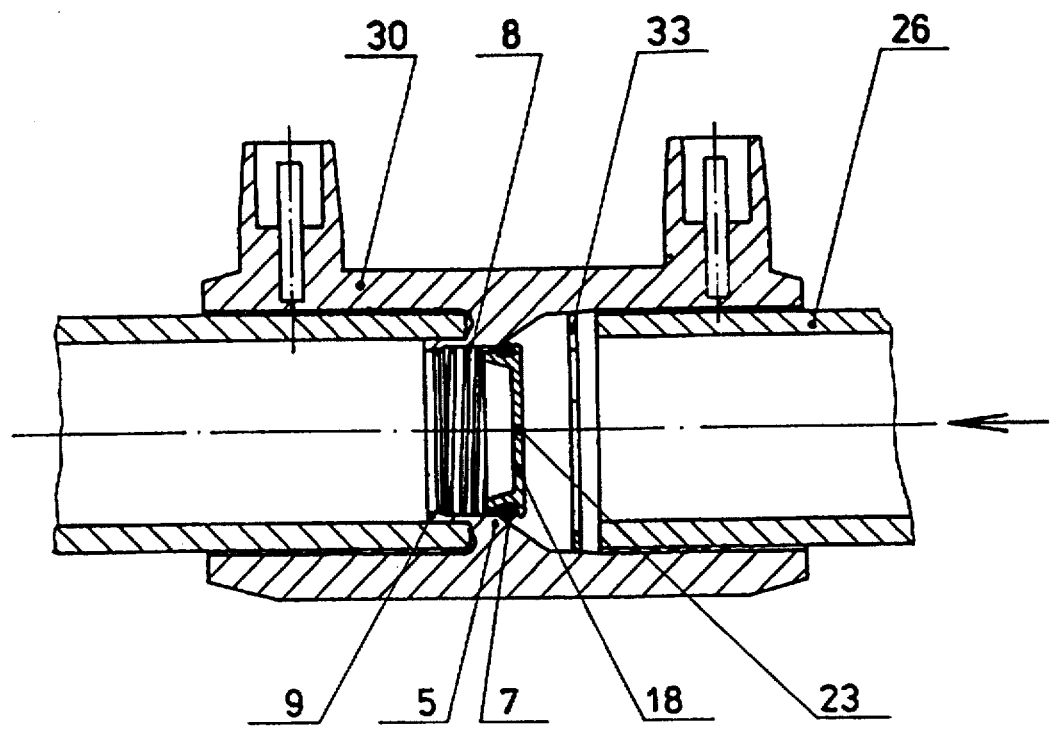
FIG. 14 shows a safety sealing device for gas pipes according to the invention integrated with an electro-welded sleeve, in the closed position.
Figure 15:
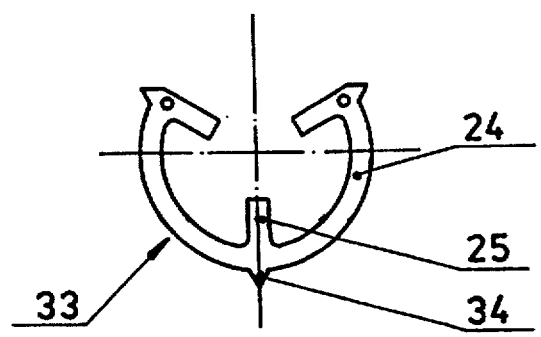
FIG. 15 shows a circlip for application in an electro-welded sleeve.

With gas pipes (26) consisting of polyethylene tubing, connections are made in many cases by means of so-called electro-welded sleeves (30). A safety sealing device advantageous for this case is shown in FIGS. 13 and 14. Whilst in FIG. 13, the safety sealing device is inserted in the electro-welded sleeve (30), in FIG. 14 the valve seat (1) is constructed in one-piece with the same. In order to realize the circlip (33) simply for the plate (8), the circular ring (24) which serves as a circlip shown in FIG. 9 has teeth (34), which press into the electro-welded sleeve, in addition to the flanges (25) distributed around the outer circumference.

As can be seen from both figures, the inner diameter of the safety sealing device can be enlarged, as they are located outside the gas pipe (26), whereby pressure reduction due to the safety sealing device can be minimized.

In order to keep the constructional increase in length, to accommodate the safety sealing device small while still guaranteeing sufficient welding length used for connection with the gas pipe (26), it is an advantage if the safety sealing device has a reduced diameter collar (31) at its outflow end, whose flow cross-section is otherwise larger than the flow cross-section in the plate area, whereby the outer diameter of the collar (31) is smaller than the inner diameter of the gas pipe (26).

It is obvious that the individual constructions described in this specification lay no claim on completeness. For example it is possible that the individual components given in the above construction can be interchanged without leaving the claimed area of protection.

We claim:

1. A safety sealing device for gas pipes comprising a valve body (6), which can be pressed against a valve seat (1), whereby the valve body (6) which is guided only through a spring (8) and is otherwise freely movable without additional support points, and is movable in the axial direction of the valve seat (1) in the closure direction against the force of said spring (8), and the valve body (6) is a freely suspended plate (18) which is supported by a spring in the open position against a circlip which is elastically deformable in the radial direction and is latched into a notch (19) formed in the valve seat (1), characterized in that the plate (18) has a lug-shaped extension (28) on its side facing said spring (8) in the axial direction, which protrudes out of the safety sealing device in the closed position and which remains within the same in the open position, said lug shaped extension being accessible externally of said safety sealing device to enable resetting of said valve body to said open position.

2. A safety sealing device for gas pipes according to claim 1, characterized in that the valve seat (1) is integrally formed with the gas inlet of a gas stopcock (29).

3. A safety sealing device for gas pipes according to claim 1, further including a circlip shoulder for the end of the spring (8) facing the valve body (6), said circlip shoulder being threadedly connected to said valve seat and adjustable in the axial direction.

4. A safety sealing device for gas pipes according to claim 1, characterized in that the circlip is formed by a split circular ring (24) which has three radial flanges (25) extending inwards distributed evenly around its circumference.

5. A valve incorporating a safety sealing device for gas pipes comprising:
   a housing;
   a valve cavity within said housing;
   an inlet passage within said housing for admitting fluid into said cavity;
   a rotary valve member within said valve cavity, said rotary valve member having a fluid passage therethrough, said rotary valve member being movable between a first position in which said valve fluid passage is in fluid communication with said inlet passage and a second position in which said valve fluid passage is out of fluid communication with said inlet passage;
   a valve seat provided within said inlet passage;
   a valve body freely movably disposed within said inlet passage;
   a biasing member within said inlet passage, said biasing member urging said valve body into an open position against a stop provided in said inlet passage;
   said valve body being movable to a closed position in response to excessive fluid flow through said inlet passage and including a projection extending axially therefrom in the direction of movement of said valve body from said open position to said closed position, said extension being operative to reset said valve body to said open position in response to movement of said rotary valve member into said second position.

6. A safety sealing device for gas pipes according to claim 5 wherein said safety sealing device is positioned within said inlet.

7. A safety sealing device for gas pipes according to claim 6 wherein said fluid shut off valve is provided within said housing.

8. A safety sealing device for gas pipes according to claim 5 wherein said stop comprises a spring clip seated within said housing.

9. A safety sealing device for gas pipes according to claim 5 further comprising a spring seat within said housing, and said biasing member comprises a spring extending between said seat and said valve member.

10. A safety sealing device for gas pipes according to claim 9 wherein the distance between said spring seat and said valve body when said valve is in said open position is adjustable.

11. A safety sealing device for gas pipes comprising a valve body (6), which can be pressed against a valve seat (1), whereby the valve body (6) which is guided only through a spring (8) and is otherwise freely movable without additional support points, and is movable in the axial direction of the valve seat (1) in the closure direction against the force of said spring (8), a circlip shoulder threadedly connected to said valve seat, said circlip shoulder being adjustable in the axial direction, said valve body (6) being a freely suspended plate (18) which is supported by a spring in the open position against a circlip which is elastically deformable in the radial direction and is latched into a notch (19) formed in the valve seat (1), characterized in that the plate (18) has a lug-shaped extension (28) on its side facing said spring (8) in the axial direction, which protrudes out of the safety sealing device in the closed position and which remains within the same in the open position, said lug shaped extension being accessible externally of said safety sealing device to enable resetting of said valve body to said open position.

12. A safety sealing device for gas pipes comprising:
   a housing;
   a valve seat provided within said housing;
   a valve body freely movably disposed within said housing;
   a spring seat within said housing;
   a spring within said housing extending between said spring seat and said valve body, said spring urging said valve body into an open position against a stop provided in said housing, the distance between said spring seat and said valve body when said valve is in an open position is adjustable;
   said valve body being movable to a closed position in response to excessive fluid flow through said housing and including a projection extending axially therefrom in the direction of movement of said valve member from said open position to said closed position, said extension being operative to enable resetting of said valve member to said open position.

* * * * *